(12) United States Patent
Kamoto et al.

(10) Patent No.: US 7,533,979 B2
(45) Date of Patent: May 19, 2009

(54) INK COMPOSITION, INK SET USING SAME, RECORDING METHOD, INK HEAD AND RECORDED IMAGE

(75) Inventors: Takanori Kamoto, Yamatokoriyama (JP); Ichiro Fujii, Gose (JP); Seila Suzuki, Yamatokoriyama (JP); Hiroaki Nakaya, Osakasayama (JP); Hiromi Nakatsu, Amagasaki (JP); Masanori Kinomoto, Nara (JP)

(73) Assignee: Sharp Kabushiki Kaisha, Osaka-Shi (JP)

( * ) Notice: Subject to any disclaimer, the term of this patent is extended or adjusted under 35 U.S.C. 154(b) by 239 days.

(21) Appl. No.: 10/543,006

(22) PCT Filed: Feb. 2, 2004

(86) PCT No.: PCT/JP2004/000997

§ 371 (c)(1),
(2), (4) Date: Jul. 22, 2005

(87) PCT Pub. No.: WO2004/069943

PCT Pub. Date: Aug. 19, 2004

(65) Prior Publication Data

US 2006/0181586 A1    Aug. 17, 2006

(30) Foreign Application Priority Data

Feb. 5, 2003    (JP)    ............................... 2003-028858

(51) Int. Cl.
*G01D 11/00* (2006.01)
(52) U.S. Cl. ......................................... 347/100; 347/96
(58) Field of Classification Search ................. 347/100, 347/95, 96, 101, 105; 106/31.6, 31.27, 31.13; 523/160
See application file for complete search history.

(56) References Cited

U.S. PATENT DOCUMENTS 6,071,334 A * 6/2000 Wider et al. ............. 106/31.43
2003/0195275 A1* 10/2003 Sanada et al. .............. 523/160
2005/0081745 A1* 4/2005 Ogawa et al. .............. 347/100

FOREIGN PATENT DOCUMENTS

JP    61-33870 B2    8/1986

(Continued)

*Primary Examiner*—Manish S Shah
(74) *Attorney, Agent, or Firm*—Birch, Stewart, Kolasch & Birch, LLP (57) ABSTRACT

An object of the present invention is to provide an ink composition having a high permeability as an inkjet ink and permitting high quality image printing even with a high speed.

To achieve the above object, the present invention provides an ink composition including:
(a) an aqueous medium having a conductivity of 250 μS/cm (at 25° C.) or lower;
(b) a pigment; and
(c) a compound represented by the formula (I):

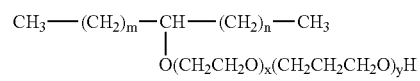

wherein m and n each are an integer of 0-11; m+n is an integer of 9-11; x is an integer of 5-9; and y is a number between 2.5-5.

19 Claims, 6 Drawing Sheets

FOREIGN PATENT DOCUMENTS

| | | |
|---|---|---|
| JP | 7-70491 A | 3/1995 |
| JP | 11-129460 A | 5/1999 |
| JP | 2003-165932 A | 6/2003 |
| JP | 2003-335988 A | 11/2003 |
| JP | 2004-18689 A | 1/2004 |
| JP | 2004-43607 A | 2/2004 |
| JP | 2004-66599 A | 3/2004 |
| JP | 2004-107480 A | 4/2004 |
| JP | 2004-107481 A | 4/2004 |
| JP | 2004-115069 A | 4/2004 |

* cited by examiner

INK COMPOSITION, INK SET USING SAME, RECORDING METHOD, INK HEAD AND RECORDED IMAGE

TECHNICAL FIELD

The present invention relates to an ink composition. More particularly, the present invention relates to the ink composition suitably used in an inkjet recording method, and an ink set, a recording method, an ink head and a recorded image using the ink composition.

BACKGROUND ART

Inkjet recording is a typical non-impact recording method to produce images by letting ink drops fly onto a medium in response to digital signals, which is a method by forming ink drops by means of mechanical or thermal action and producing images on an image-recording element such as paper by using the ink drops.

The inkjet recording does not involve a process such as development or fixing needed in recording methods such as electrophotography and thus permits easy device downscaling as well as high-speed and low-noise recording.

Owing to relative inexpensiveness of recording devices and easiness of colorization, this recording method has been widely used in recent years with output devices for office machines and for consumer-oriented personal computers.

With this being the situation, it is most desired for this recording method to be able to print at a high speed and stably images having high quality comparable to that of electrophotographs.

Printing at a high speed and stably needs accelerating ink drying on a medium. A method of accelerating drying by using a combination of alcoholic amine and fat dye is disclosed in, for example, Japanese Examined Patent Publication No. Sho 61(1986)-33870. However, this method has a problem in print quality.

On the other hand, in high quality image printing, a method by simultaneous performance of heating and printing to ensure high quality images is disclosed in, for example, Japanese Unexamined Patent Publication Hei 11(1999)-129460. However, in high speed printing by this method, there will be unevenness in propagation of heat, resulting in a failure to keep high quality. Furthermore, in such a case, power consumption might potentially increase.

Also, there have currently been few discussions concerning the use of a pigment as a coloring material.

DISCLOSURE OF INVENTION

An object of the present invention is to provide an ink composition: capable of simultaneously achieving quick drying and high quality image printing, contrary goals as described; having a high permeability as an inkjet ink; and permitting high quality image printing even with a high speed.

According to the present invention, there is provided an ink composition comprising:
(a) an aqueous medium having a conductivity of 250 μS/cm (at 25° C.) or lower;
(b) a pigment; and
(c) a compound represented by the formula (I):

wherein m and n each are an integer of 0-11; m+n is an integer of 9-11; x is an integer of 5-9; and y is a number between 2.5-5.

Also, according to the present invention, there are provided
(1) an ink set comprising:
the above ink composition, wherein the pigment is C.I. Pigment Blue 15:3 or C.I. Pigment Blue 15:4;
the above ink composition, wherein the pigment comprises at least one pigment selected from the group consisting of C.I. Pigment Red 122, C.I. Pigment Red 209 and C.I. Pigment Violet 19; and
the above ink composition, wherein the pigment comprises at least one pigment selected from the group consisting of C.I. Pigment Yellow 74, C.I. Pigment Yellows 128 and 138, and C.I. Pigment Yellow 180, and (2) an ink set comprising:
the above ink composition, wherein the pigment is C.I. Pigment Blue 15:3 or C.I. Pigment Blue 15:4;
the above ink composition, wherein the pigment comprises at least one pigment selected from the group consisting of C.I. Pigment Red 122, C.I. Pigment Red 209 and C.I. Pigment Violet 19;
the above ink composition, wherein the pigment comprises at least one pigment selected from the group consisting of C.I. Pigment Yellow 74, C.I. Pigment Yellows 128 and 138, and C.I. Pigment Yellow 180; and
the above ink composition, wherein the pigment is a carbon black.

Furthermore, according to the present invention, there is provided a recorded image which is recorded by using the above ink composition.

By including the compound of the formula (I), the ink composition permits ink ejection stability even in high speed printing and has an excellent property of quick drying of ink and low-bleeding property, thereby achieving high quality print.

BEST MODE FOR CARRYING OUT THE INVENTION

An ink composition of the present invention includes a compound represented by the formula (I):

wherein m and n each are an integer of 0-11; m+n is an integer of 9-11; x is an integer of 5-9; and y is a number between 2.5-5. The compound of the formula (I) provides an ink with a property hard to foam, and has a good application properties with respect to members of a printer nozzle. As a result, even if foams are generated in the ink, they are relatively prone to disappear to ensure stable ink feed in high speed printing. Furthermore, the composition has the effect of accelerating the permeation of the ink into paper in printing on a medium, especially on ordinary paper.

The compound of the formula (I), by being contained in a critical micelle concentration or above, for example in a concentration of 0.1-2.0 parts by weight, more specifically in a concentration of 0.5-1.5 parts by weight in the above ink composition, has the effects as described above.

In the ink composition of the present invention, an aqueous medium has a conductivity of 250 μS/cm (at 25° C.) or lower. This is because if the conductivity is higher than 250 μS/cm (at 25° C.), the aqueous medium contains impurities in many cases, potentially resulting in a failure to exhibit a desired effect to a full extent.

Herein, the content of the aqueous medium according to the present invention is not particularly limited as long as the conductivity thereof is in the above range.

The ink composition of the present invention preferably has a conductivity of 8 mS/cm (at 25° C.) or lower, more specifically between 0.05 and 5 mS/cm. Also, the viscosity is preferably 20 mPa·S or lower, more specifically 15 mPa·S or lower in order for drops of the ink composition to be stably ejected. The surface tension is preferably 20-60 mN/m, more specifically 20-50 mN/m.

An pigment to be used in an amount of 0.1-10 parts by weight in the ink composition of the present invention is not particularly limited, but preferably it is a self-dispersion type pigment obtained by a known method such as introducing a carboxylic acid or a sulfonic acid on its surface, and more preferably it is a pigment having excellent water resistance, light resistance and dispersion stability.

Examples of cyan pigments include, for example, C.I. (Color Index) Pigment Blues 1, 2, 15, 15:1, 15:2, 15:3, 15:4, 16, 17, 21, 22, 60, 64 and the like. By including as a pigment C.I. Pigment Blue 15:3 or C.I. Pigment Blue 15:4 among these, the ink composition can realize recorded images having excellent cyan color development properties.

Examples of magenta pigments include, for example, C.I. Pigment Reds 1, 2, 3, 5, 10, 16, 23, 30, 31, 48:1, 48:2, 49:1, 52, 53:1, 57:1, 58:4, 63, 122 and 209, as well as C.I. Pigment Violet 19 and the like. By including as a pigment at least one pigment selected from the group consisting of C.I. Pigment Red 122, C.I. Pigment Red 209 and C.I. Pigment Violet 19 among these, the ink composition can realize recorded images having excellent magenta color development properties.

Examples of yellow pigments include, for example, C.I. Pigment Yellows 3, 12, 13, 14, 15, 23, 55, 74, 83, 93, 95, 97, 128, 138, 150, 154, 167, 180, 193 and the like. By including as a pigment at least one pigment selected from the group consisting of C.I. Pigment Yellow 74, C.I. Pigment Yellows 128 and 138, and C.I. Pigment Yellow 180 among these, the ink composition can realize recorded images having excellent yellow color development properties.

Examples of black pigments include, for example, a channel black, a furnace black, a thermal black, a lamp black and a carbon black. By including as a pigment a carbon black among these, the ink composition can realize recorded images having excellent black color development properties.

These color pigments can be arbitrarily combined, and for example, an ink set including a combination of cyan, magenta and yellow can realize recorded images in deep black color similar in color concentration to recorded images to be formed from a black color ink composition. Also, an ink set including a combination of cyan, magenta, yellow and black can suitably reproduce black color and realize full-color recorded images having excellent color balance and color development properties.

The ink composition of the present invention preferably comprises at least one water-soluble organic solvent having a vapor pressure higher than that of water, and specifically a vapor pressure of 0.05 mmHg or lower at 20° C. and the total amount of organic solvents including other water-soluble organic solvents is preferably 10-70 wt % and more preferably 10-50 wt %. This assists to inhibit the ink composition from drying and improve the ejection stability.

Specific examples of water-soluble organic solvents include, for example, glycol ethers (e.g., ethylene glycol monomethyl ether, diethylene glycol monomethyl ether, ethylene glycol monobutyl ether, diethylene glycol monoethyl ether, triethylene glycol monobutyl ether, propylene glycol-monoethyl ether, tetraethylene glycol monomethyl ether, ethylene glycol monophenyl ether and the like), alcohols (e.g., methanol, ethanol, propanol, isopropanol, 1,5-pentanediol, 1,4-butanediol, 1,3-propanediol and the like), polyhydric alcohols (e.g., 1,2,6-hexanetriol, glycerol), amides (e.g., dimethylformamide, dimethylacetamide and the like), ethers (e.g., 1,4-dioxane, tetrahydrofuran and the like), ketones (e.g., acetone and the like), glycols(e.g., polyethylene glycol, polypropylene glycol, ethylene glycol, thiodiglycol, propylene glycol, triethylene glycol, diethylene glycol and the like), sulfur-containing compounds (e.g., sulfolane, dimethyl sulfoxide and the like), polyfunctional compounds (e.g., dimethylaminoethanol, diethylaminoethanol, triethanolamine, morpholine and the like), and nitrogen-containing compounds (e.g., 2-pyrrolidone, N-methylpyrrolidone, ε-caprolactam, γ-butyrolactone and the like). Among these, glycol ethers and/or polyhydric alcohols are preferable.

The ink composition of the present invention can contain, in addition to the above ingredients, compounds having the following formulae:

(a)

wherein m and n each are an integer of 0-30; and m+n is an integer of 0-30, (b)

wherein m is an integer of 11-13; and n is an integer of 3-30, wherein m and n each are an integer of 0-11; m+n is an integer of 9-11; and x is an integer of 3-50, and wherein p is an integer of 0-78; q is an integer of 2-15; and r is an integer of 0-18.

The ink composition of the present invention may include, in addition to the ingredients mentioned so far, other additives such as a mildewproofing agent selected from sodium dehydroacetate, sodium benzoate, sodium salt of sorbitan acid and the like, a pH adjustor selected from triethanolamine, sodium hydroxide, sodium nitrate, potassium nitrate and the like, a chelating agent, a rust-proofing agent, an ultraviolet absorber, an acrylic resin, a dye and the like.

Among these, the dye is not particularly limited as long as it is a water-soluble dye, and specific examples of such dyes include an acid dye, a direct dye, a reactive dye and the like. Among these, dyes excellent in water resistance and light resistance and further in safety can be used suitably.

Examples of cyan dyes include, for example, C.I. Acid Blues 7, 9, 29, 45, 92 and 249, C.I. Direct Blues 1, 2, 6, 15, 22, 25, 71, 76, 79, 86, 90, 98, 163, 165, 199 and 202, and C.I. Reactive Blues 1, 2, 7, 14, 15, 23, 32, 38, 41, 63, 80 and 95. Among these, at least one cyan dye selected from C.I. Acid Blue 7, C.I. Acid Blue 9 and C.I. Direct Blue 199 is particularly preferable.

Examples of magenta dyes include, for example, C.I. Acid Reds 1, 8, 13, 14, 18, 26, 27, 35, 37, 42, 52, 82, 87, 89, 92, 97, 106, 111, 114, 115, 134, 186, 249, 254 and 289, C.I. Direct Reds 1, 4, 9, 13, 17, 20, 28, 31, 39, 80, 81, 83, 89, 225 and 227, C.I. Direct Oranges 26, 29, 62 and 102, and C.I. Reactive Reds 1, 14, 17, 25, 26, 32, 37, 44, 46, 55, 58, 60, 66, 74, 79, 96, 97, 141, 147, 180 and 181. Among these, at least one magenta dye selected from C.I. Acid Red 52, C.I. Acid Red 289, C.I. Reactive Red 58, C.I. Reactive Red 141 and C.I. Reactive Red 180 is particularly preferable.

Examples of yellow dyes include, for example, C.I. Acid Yellows 1, 7, 17, 23, 42, 44, 79 and 142, C.I. Direct Yellows 1, 12, 24, 26, 33, 44, 50, 86, 120, 132, 142 and 144, and C.I. Reactive Yellows 1, 5, 11, 13, 14, 20, 21, 22, 25, 40, 47, 51, 55, 65 and 67. Among these, at least one yellow dye selected from C.I. Acid Yellow 17, C.I. Acid Yellow 23 and C.I. Direct Yellow 86 is particularly preferable.

Examples of black dyes include, for example, C.I. Food Black 2, C.I. Direct Blacks 19, 22, 32, 38, 51, 56, 71, 74, 75, 77, 154, 168 and 171, C.I. Reactive Blacks 3, 4, 7, 11, 12 and 17. Among these, at least one black dye selected from C.I. Food Black 2 and C.I. Direct Black 154 is particularly preferable.

The amount of a dye to be added is not particularly limited, but in general, it is in the range of 0.05-20 wt %, and preferably it is in the range of 0.1-15 wt %. The amount of a dye less than 0.05 wt % is not preferable, because a required color tone and contrast is less obtainable. Also, the amount of a dye exceeding 20 wt % is not preferable either, because clogging is more prone to occur in the nozzle.

Also, according to the present invention, there are provided a recording method for recording images comprising allowing ink to adhere to a recording medium and a recording method for recording images comprising applying a pressure to eject drops of an ink and to allow the drops to adhere to a recording medium. Both of the methods, by using the ink composition of the present invention, not only permit stable ejection but also ensure high quality recorded images having excellent water resistance, excellent excoriation resistance and low-bleeding property.

Furthermore, according to the present invention, there is provided an ink head permitting stable ejection and recorded images having high quality, excellent water resistance, excellent excoriation resistance and low-bleeding property.

More specifically, the ink head of the present invention is constructed to comprise (i) an ink tank retaining an ink composition of present invention; (ii) an ink chamber having an ejection orifice through which drops are ejected, and having the ink composition fed from the ink tank; and (iii) a piezoelectric element provided inside the ink chamber and causing a strain in response to a voltage applied to the ink composition stored in the ink chamber. With the above construction, the present invention can provide a piezo-type ink head having high reliability in which ink drops are ejected through the ejection orifice according to the voltage applied to the piezoelectric element.

The ink head of the present invention may comprise, instead of the piezoelectric element recited in (iii), (iii)' a heating element provided inside the ink chamber for heating the ink composition stored in the ink chamber to create a bubble so that a pressure is applied to the ink composition. In such a case, the present invention can provide a thermal inkjet type ink head in which ink drops are ejected through the ejection orifice according to the voltage applied to the heating element.

Ink heads of these types can be used for various devices for a recording purpose such as an inkjet printer, a Bubble Jet™ printer and the like.

Still further, according to the present invention, there is provided a recorded image which is recorded by using the ink composition of the present invention.

To give a more detailed explanation of the present invention, the attached drawings will be referred to.

Figure 1:
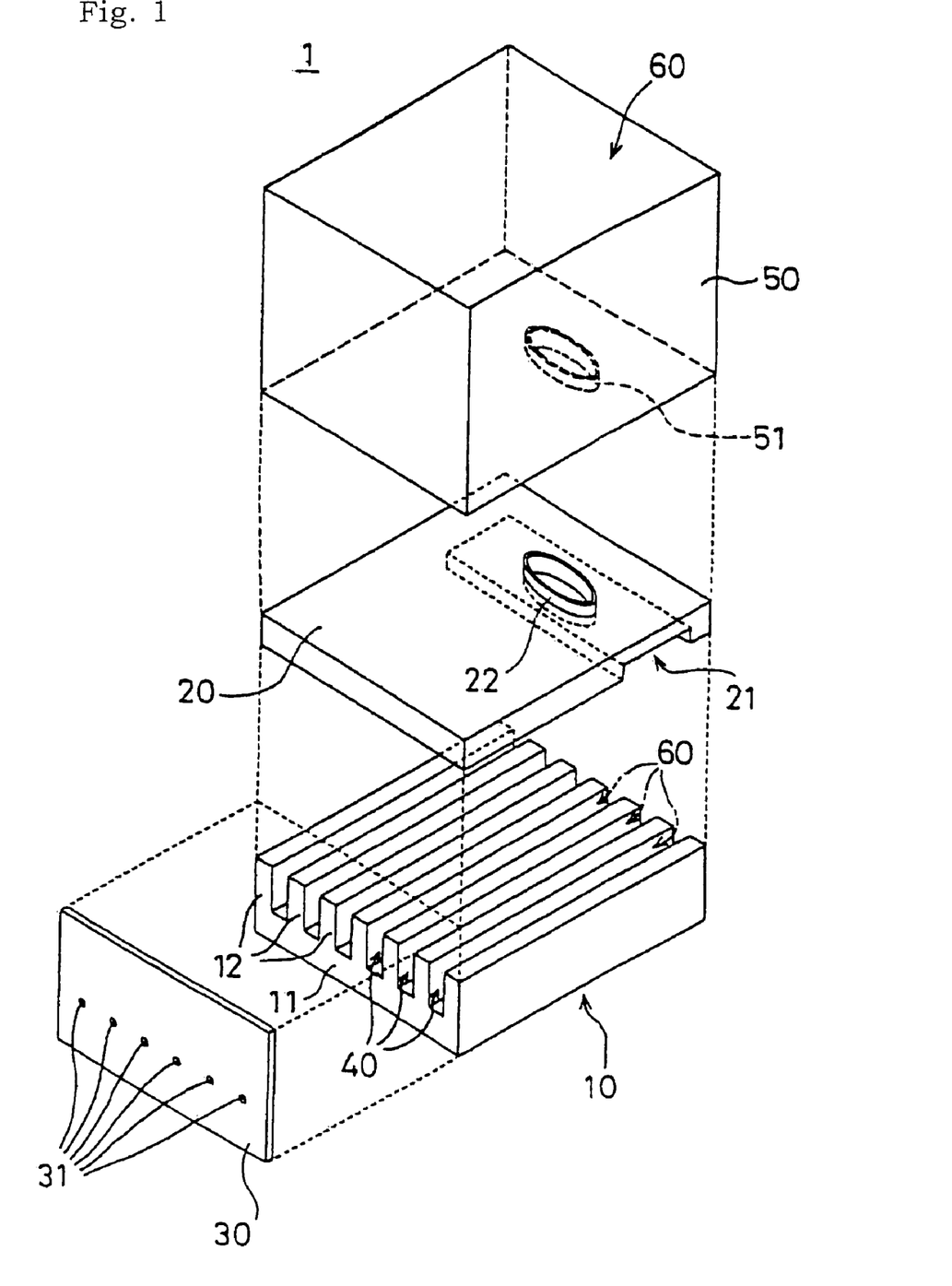
FIG. 1 is an exploded perspective view showing, in a simplified form, the construction of a piezo-type ink head 1 according to an embodiment of the present invention (driving electrodes of FIG. 2 are omitted)

FIG. 1 is an exploded perspective view showing, in a simplified form, the construction of a piezo-type ink head 1 according to an embodiment of the present invention.

The ink head 1 includes: a head plate 10 having a bottom wall 11 formed of a piezoelectric material and a plurality of ribs 12; a top plate 20 provided on the top faces of the ribs 12; and a plurality of ejection orifices 31, and further includes: a nozzle plate 30 provided on one end of the ribs 12; a rear plate, not illustrated, provided on the other end of the ribs 12; and an ink tank 50 overlying the top plate 20 and having an opening 51. The plurality of ribs 12 are arranged parallel at intervals of a given length on the bottom wall 11, so that a plurality of ink chambers 40 are defined by the plurality of ribs 12, the bottom wall 11, the top plate 20, the nozzle plate 30 and the rear plate, not illustrated. The top plate 20 has formed therein a common ink feed passage 21 that communicates with the ink chambers 40, as well as an ink feed duct 22 that joins the common ink feed passage 21 and the opening 51 of the ink tank 50 together. In the ink tank 50 is retained an ink composition 60, which is fed via the common ink feed passage 21 to the ink chambers 40.

Figure 2:
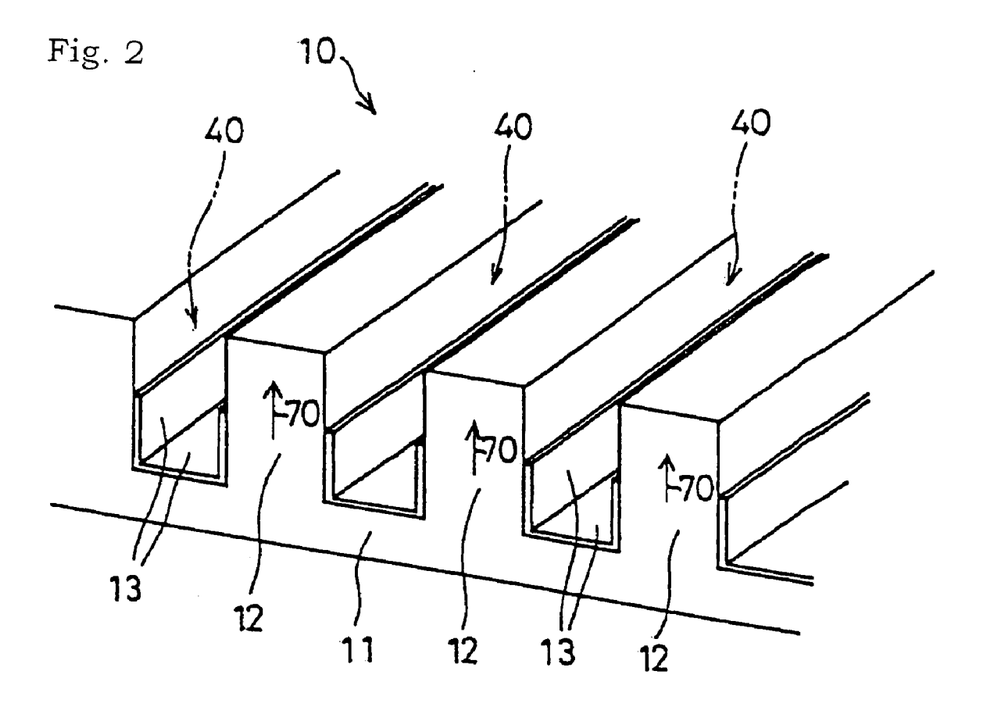
FIG. 2 is a plan view showing part of the construction of the ink head 1 shown in FIG. 1.

FIG. 2 is a view showing, in an enlarged form, part of the construction of the head plate 10, which constitutes the ink head 1 shown in FIG. 1.

Driving electrodes 13 for applying a voltage to the plurality of ribs 12 are formed on surfaces, fronting on the ink chambers 40, of the bottom wall 11 of the head plate 10 and of the plurality of ribs 12. The piezoelectric material constituting the plurality of ribs 12 is polarized in the direction of arrow 70, and the plurality of ribs 12 function as a piezoelectric element.

The ink head 1 thus constituted is a piezo-type ink head, in which drops of the ink composition 60 are ejected through the ejection orifices 31 according to the voltage applied to the plurality of ribs 12, which are the piezoelectric element.

There will be explained the principle according to which the ink composition 60 is ejected from the ink chambers 40 in the ink head 1.

Figure 3:
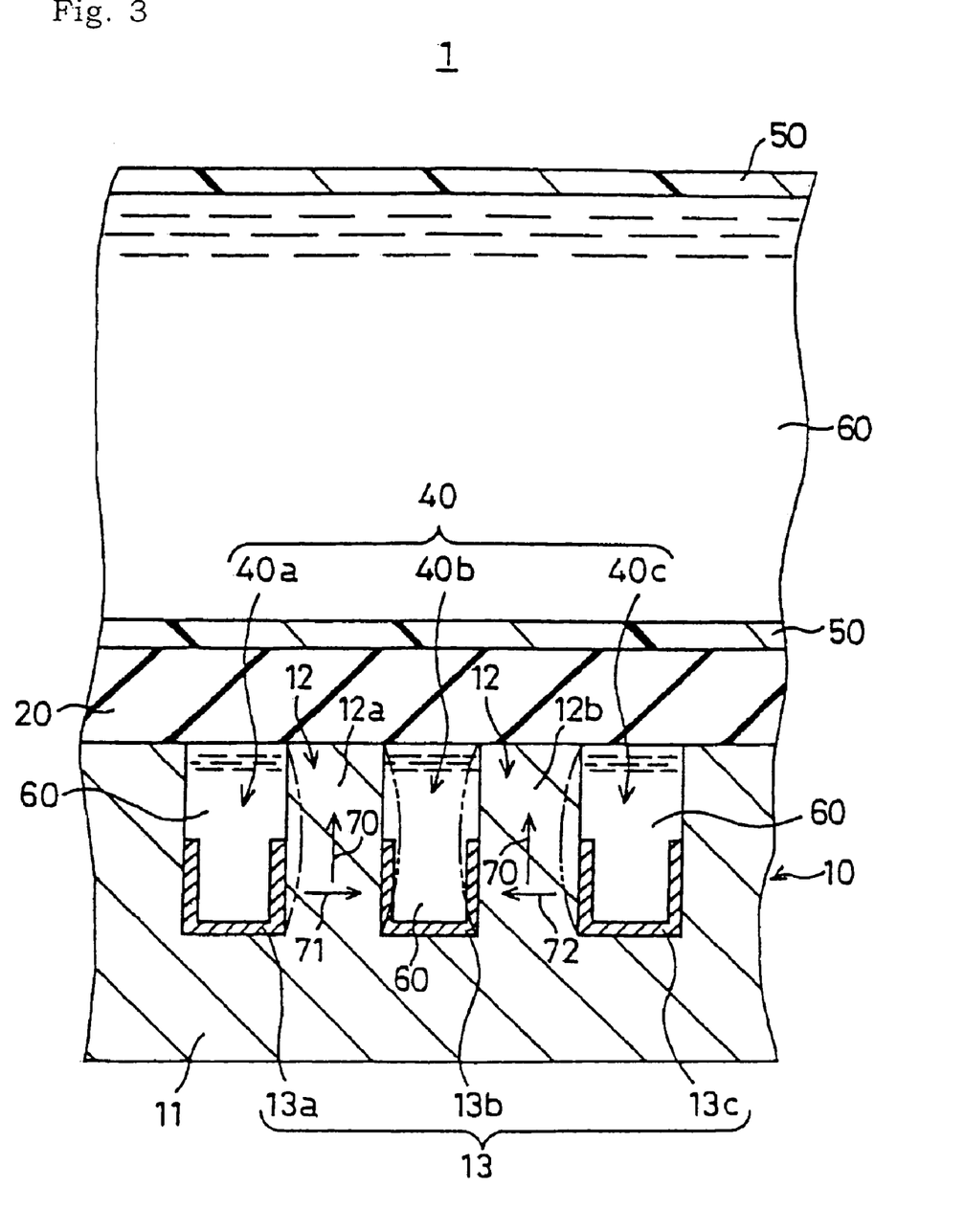
FIG. 3 is a cross sectional view of the ink head 1 viewed along the direction in which the ink chambers 40 extend.

FIG. 3 is a cross section of the ink head 1 in FIG. 1 viewed along the direction in which the ink chambers 40 extend. Herein, the operation implemented for the ink composition 60 to be ejected from an ink chamber 40b will be explained.

When a voltage is not applied to a rib 12a nor to a rib 12b, the ribs 12a and 12b constituting the ink chamber 40b, that is, when there is no potential difference between a driving electrode 13b of the ink chamber 40b and a driving electrode 13a of a ink chamber 40a adjacent to the ink chamber 40b nor between the driving electrode 13b of the ink chamber 40b and a driving electrode 13c of the ink chamber 40c adjacent to the ink chamber 40b, the ink chamber 40b is loaded with the ink composition 60 fed from the ink tank 50 by means of capillary action. Likewise, the ink chambers 40a and 40c are also loaded with the ink composition 60.

When a voltage is applied to the driving electrode 13a and driving electrode 13c, a potential difference is caused between the driving electrode 13b and driving electrode 13a and between the driving electrode 13b and driving electrode 13c to apply the voltage to the ribs 12a and 12b, which constitute the ink chamber 40b. The voltage induces electric fields within the ribs 12a and 12b in the directions of arrows 71 and 72, and the actions of the electric fields cause strains on the ribs 12a and 12b, which constitute the ink chamber 40b, with the result that the ribs 12a and 12b each are deformed into a shape having a prominence on the ink chamber 40b side. This gives rise to a pressure wave to apply a high pressure to the ink composition 60 loaded in the ink chamber 40b, whereby drops of the ink composition 60 are ejected through the ejection orifices 31.

When the application of the voltage to the driving electrode 13a and driving electrode 13c is stopped, the ribs 12a and 12b recover to their original shape, and the ink chamber 40b recovers to its original volume. In turn, an amount of the ink composition 60 to compensate for an increase in volume given by the restoration is fed from the ink tank 50 via the common ink feed passage 21, so that the ink chamber 40b returns to the initial state in which it is loaded with the ink composition 60.

In the ink head 1 of the present embodiment, as described above, the ink tank 50 retains the ink composition 60 of the present embodiment, and the ink composition 60 is fed to the ink chambers 40 and ejected as drops through the ejection orifices 31. Thus, the ink head 1 permits stable ejection of the drops of the ink composition 60 through the ejection orifices 31. By using such an ink head, it is possible to realize a piezo-type inkjet recording device having high reliability.

According to the present embodiment, the ribs 12, which constitute the ink chambers 40, are formed of the piezoelectric material, and serves as the piezoelectric element. However, the material of the ribs 12 is not limited thereto, but the ribs forming the ink chambers may be formed of a material other than the piezoelectric material, and the piezoelectric element may be provided inside or outside the ribs.

Figure 4:
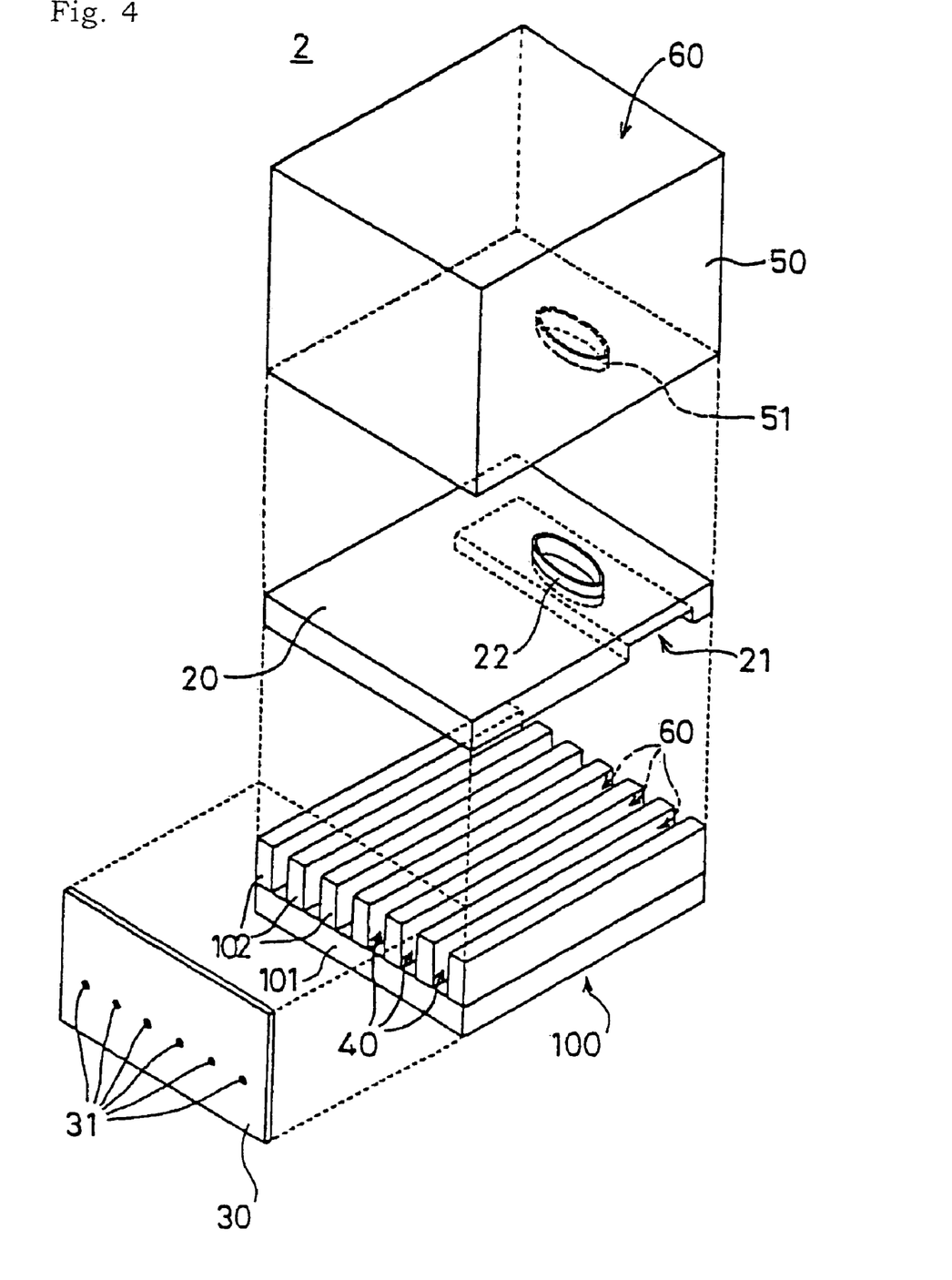
FIG. 4 is an exploded perspective view showing, in a simplified form, the construction of an ink head 2 according to another embodiment of the present invention.
Figure 5:
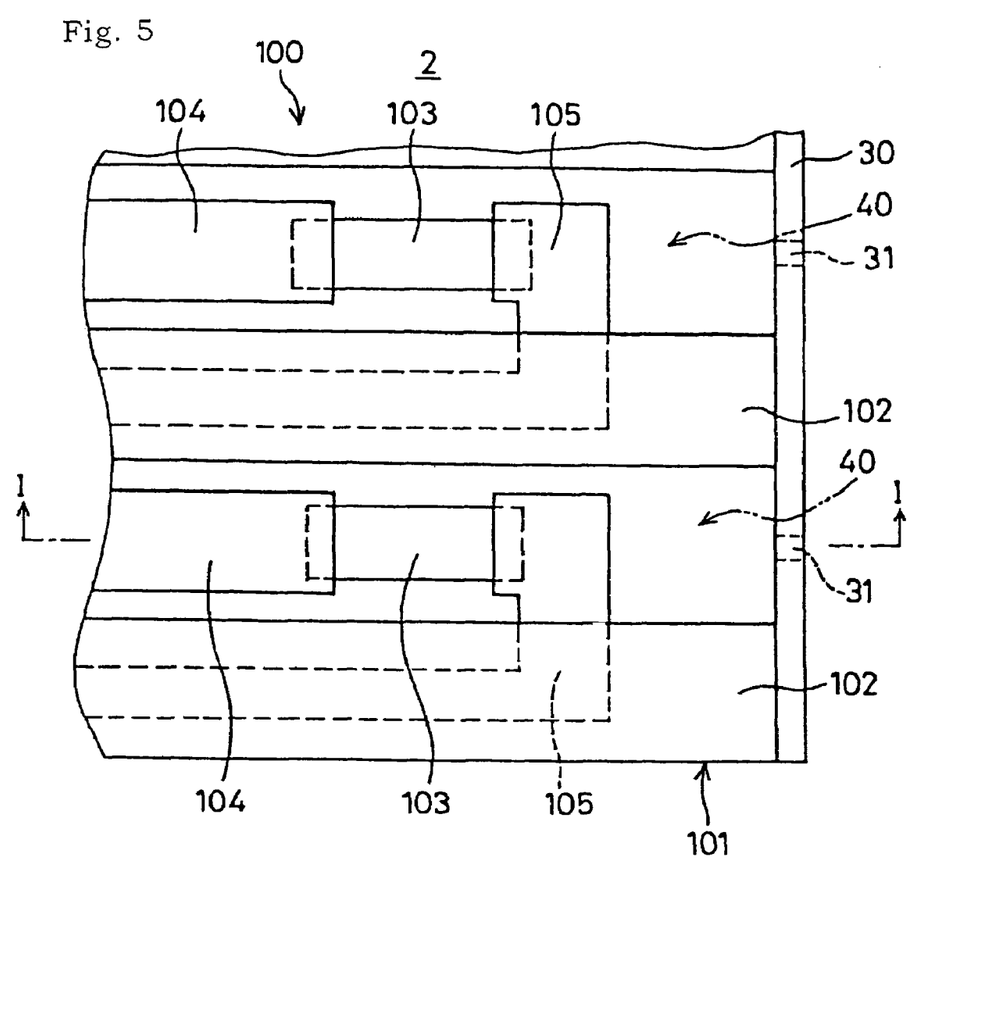
FIG. 5 is a plan view showing part of the construction of the ink head 2 shown in FIG. 4.

FIG. 4 is an exploded perspective view showing, in a simplified form, the construction of an ink head 2 according to another embodiment of the present invention. FIG. 5 is a plan view showing part of the construction of the ink head 2 shown in FIG. 4. However, in FIG. 5, the top plate 20 and the ink tank 50 in FIG. 4 are omitted to avoid complexity of the illustration and to not make understanding difficult. The ink head 2 of the present embodiment is similar to the ink head 1, and corresponding components are denoted by the same reference numeral and explanations thereof are omitted.

It is to be noted that a head plate 100 comprises: a substrate 101; a plurality of ribs 102 arranged parallel at intervals of a given length on the substrate 101; a heater 103 provided as a heating element on the surface of the substrate 101 fronting on the ink chambers 40; and driving electrodes 104 and 105 for applying a voltage to the heater 103.

The ink head 2 thus constituted is a thermal inkjet type ink head in which drops of the ink composition 60 are ejected through the ejection orifices 31 according to a voltage applied to the heater 103 serving as the heating element.

There will be explained the principle according to which the ink composition 60 is ejected from the ink chambers 40 in the ink head 2.

Figure 6:
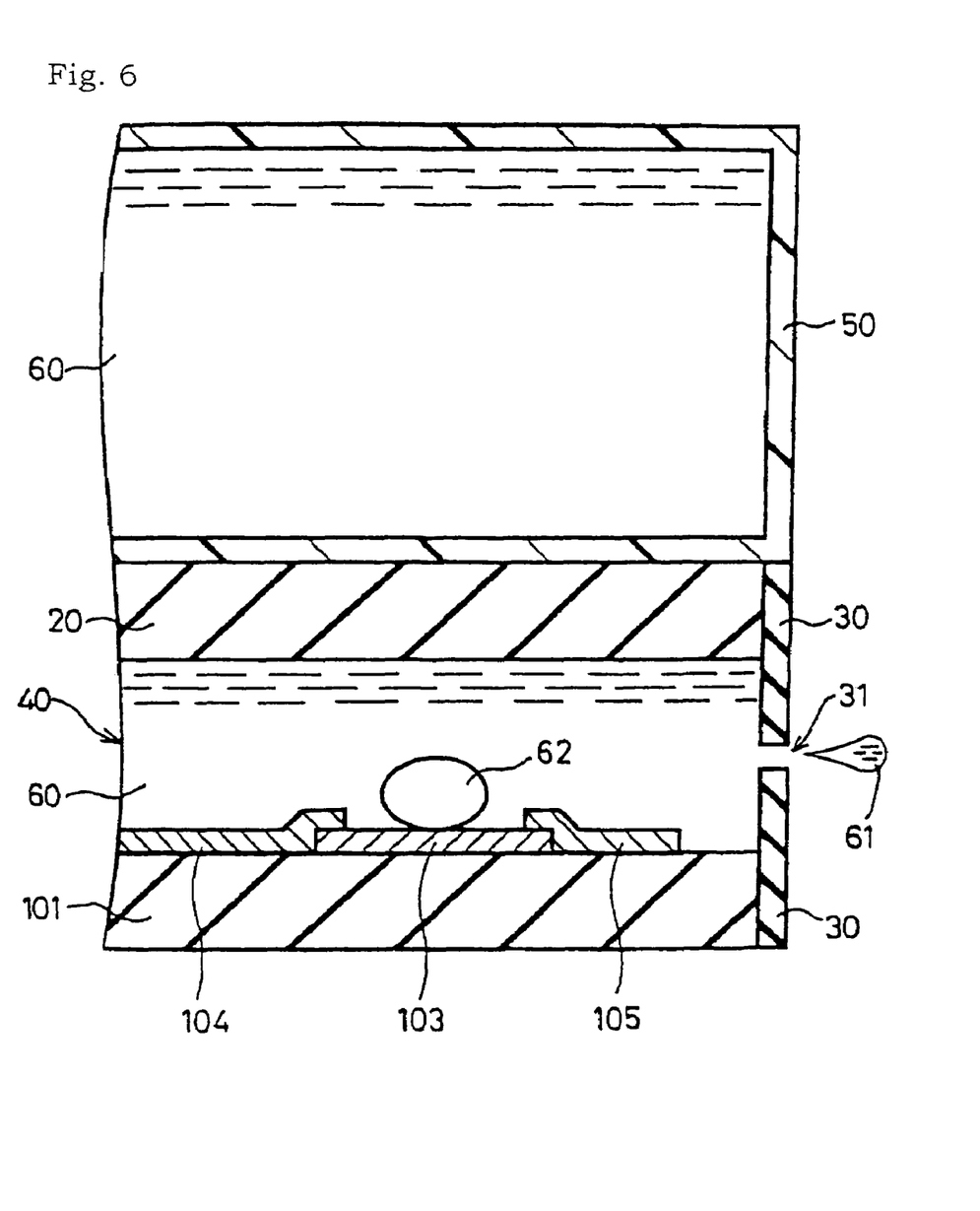
FIG. 6 is a view showing the state in which a drop 61 of the ink composition 60 is ejected from the ink chamber 40.

FIG. 6 is a view showing the state in which a drop 61 of the ink composition 60 is ejected from the ink chamber 40.

In FIG. 6, the ink head 2 is shown in cross section taken along line I-I of FIG. 5.

When a voltage is not applied to the heater 103, as in the case where in the ink head 1, the voltage is not applied to the ribs 12, the ink chamber 40 is loaded with the ink composition 60.

When a voltage is applied to the heater 103 by means of the driving electrodes 104 and 105, the heater 103 generates heat, so that the ink composition 60 loaded in the ink chamber 40 is heated to create a bubble 62. This gives rise to a pressure wave to apply a high pressure to the ink composition 60 loaded in the ink chamber 40, whereby the drop 61 of the ink composition 60 is ejected through the ejection orifice 31.

When the application of the voltage to the heater 103 is stopped, the ink composition 60 loaded in the ink chamber 40 is cooled, the bubble 62 eliminates, and an amount of the ink composition 60 to compensate for an increase in volume given by the restoration is fed from the ink tank 50 via the common ink feed passage 21, so that the ink chamber 40 returns to the initial state in which it is loaded with the ink composition 60.

In the ink head 2 of the present embodiment, like the ink head 1, the ink tank 50 retains the ink composition 60, which is fed to the ink chambers 40 and ejected as the drops 61 through the ejection orifices 31. Thus, the ink head 1 permits stable ejection of the drops 61 of the ink composition 60 through the ejection orifices 31. By using such an ink head, it is possible to realize a thermal inkjet type recording device having high reliability.

EXAMPLES

Next, Examples directed to the ink composition of the present invention and Comparative Examples are shown below.

Examples and Comparative Examples shown in Table 1 were constituted. Herein, in all the cases, ingredients were shown in parts by weight to make the total of 100.

TABLE 1

|  |  | Examples | | | | | | Comparative Examples | | | | |
|---|---|---|---|---|---|---|---|---|---|---|---|---|
|  |  | 1 | 2 | 3 | 4 | 5 | 6 | 1 | 2 | 3 | 4 | 5 |
|  | Compound of formula (1) | 1 | 2 | 1.5 | 2 | 1.5 | 2.5 |  |  |  |  | 1 |
| Organic solvents | 1,2-Hexanediol | 3 | 6 | 7 | 7 | 7 | 7 | 3 | 6 | 9 | 9 | 10 |
|  | Glycerol | 5 | 5 | 3 |  |  |  | 5 | 5 | 3 |  | 20 |
|  | 2-Pyrrolidone | 5 | 2 | 2 | 5 | 5 | 5 | 5 | 2 | 2 | 5 | 15 |
|  | Isopropanol |  |  |  | 1 | 1 | 1 |  |  |  | 1 | 5 |
|  | Trimethylolpropane |  | 5 |  |  |  |  |  | 5 |  |  | 2 |
| Pigments | Pigment Blue 15:3 | 2.5 |  |  |  |  |  |  |  |  |  | 4 |
|  | Pigment Blue 15:4 |  | 2 |  |  |  |  |  |  |  |  |  |
|  | Pigment Red 122 |  |  | 4 |  |  |  |  |  |  |  |  |
|  | Pigment Yellow 74 |  |  |  | 3.5 |  |  |  |  |  |  |  |
|  | Pigment Yellow 180 |  |  |  |  | 3.5 |  |  |  |  |  |  |
|  | Carbon black |  |  |  |  |  | 5 |  |  |  | 5 |  |
|  | Pigment Blue 17 |  |  |  |  |  |  | 2 |  |  |  |  |
|  | Pigment Red 58 |  |  |  |  |  |  |  | 3 |  |  |  |
|  | Pigment Yellow 13 |  |  |  |  |  |  |  |  | 2 |  |  |
| Others | Formula (a) (m + n = 10) |  |  |  |  | 1 |  | 1 |  |  |  |  |
|  | Formula (b) (m = 12, n = 15) |  |  |  | 0.5 |  | 0.5 |  | 1.5 |  |  |  |
|  | Diisobutylsulfosuccinic acid |  |  |  |  |  |  |  |  | 1 |  |  |
|  | Dodecyl sulfate |  |  |  |  |  |  |  |  |  | 1.5 |  |
|  | Acrylic resin | 1 | 4 | 3 | 4 | 4 | 3 | 10 | 3 | 5 | 2 | 2 |
|  | Ammonium sulfate |  |  |  |  |  | 0.5 |  |  |  |  | 0.7 |
| Water |  | Bl | Bl | Bl | Bl | Bl | Bl | Bl | Bl | Bl | Bl | Bl |
| (Conductivity μS/cm) |  | (250) | (10) | (1) | (0.5) | (4.0) | (3.0) | (290) | (200) | (10) | (1) | (80) |

Bl: Balance (1) Conductivity

The conductivities at 25° C. of the ink compositions with ingredients shown in Table 1 were measured using CM-40G manufactured by TOA Corp.

(2) High Speed Printing

The printable number of sheets in continuous printing at 7 PPM using the above composition used at a printing density of 5% by a modified printer AJ2000 manufactured by Sharp Corporation was determined. The printable number of sheets during the period after the ink tank was loaded with ink until it became empty was about 200.

In the experiment, each ink composition was reloaded at the time when the ink tank became empty, the recharging operation was repeated until being not able to print, and the number of printed sheets obtained by that time was decided as the printable number of sheets. The mark ○ was put when the printable number of sheets exceeded 200, the mark Δ was put when the printable number of sheets was 150-200, and the mark × was put when the printable number of sheets was 150 or smaller.

(3) Velocity of Drying

Printing was performed in the same manner as in (2), and 15 seconds directly after the completion of the printing, the same type of sheet as used in the printing was applied onto the printing surface of the medium under predetermined conditions, and the mark × was put when the ink was transferred and the mark ○ was put when the ink was not transferred.

(4) Evaluation on Bleeding

A particular pattern was printed on a PPC sheet (SF4AM3 manufactured by Sharp Corporation) in the same manner as in (2) and was allowed to stand for one day to make an evaluation using a relative value when the value of a line width of the pattern free of bleeding is assumed to be 100.

The mark ○ was put when the value was 150 or smaller, the mark Δ was put when the value was in the range of 150 to 250, and the mark × was put when the value was greater than 250.

(5) Evaluation on Foaming

The ink compositions were shaken for 20 seconds and the heights of their foams after five minutes were measured. The mark ○ was put when the height was 10 mm or lower and the mark × was put when it exceeded 10 mm.

Table 2 shows the results.

TABLE 2

|  | Examples | | | | | | Comparative Examples | | | | |
|---|---|---|---|---|---|---|---|---|---|---|---|
|  | 1 | 2 | 3 | 4 | 5 | 6 | 1 | 2 | 3 | 4 | 5 |
| Conductivity (mS/cm) | 0.25 | 0.1 | 0.4 | 0.6 | 0.6 | 7.0 | 0.8 | 0.2 | 0.1 | 0.3 | 8.1 |
| High speed printing | ○ | ○ | ○ | ○ | ○ | ○ | Δ | × | Δ | ○ | × |
| Velocity of drying | ○ | ○ | ○ | ○ | ○ | ○ | × | ○ | × | × | ○ |
| Bleeding | ○ | ○ | ○ | ○ | ○ | ○ | Δ | ○ | ○ | × | ○ |
| Foaming | ○ | ○ | ○ | ○ | ○ | ○ | × | ○ | × | × | × |

Next, inks of Examples 1-5 and Comparative Examples 1-3 were combined as shown in FIG. 3 and the resulting three-color blacks each composed of cyan, magenta and yellow in the proportion of 1:1:1 were printed on glossy paper.

TABLE 3

|  | Cyan | Magenta | Yellow |
|---|---|---|---|
| Combination 1 | Pigment Blue 15:3 | Pigment Red 122 | Pigment Yellow 74 |
| Combination 2 | Pigment Blue 15:3 | Pigment Red 122 | Pigment Yellow 180 |
| Combination 3 | Pigment Blue 15:4 | Pigment Red 122 | Pigment Yellow 74 |
| Combination 4 | Pigment Blue 15:4 | Pigment Red 122 | Pigment Yellow 180 |
| Combination 5 | Pigment Blue 17 | Pigment Red 58 | Pigment Yellow 13 |

A single color black prepared from an ink of Example 6 and the three-color blacks prepared from the inks of Examples and Comparative Examples were subjected to a calorimeter (X-Rite 938 manufactured by Macbeth Co.). Herein, the differences of the values of the ink of Example 6 from the values of each three-color black were evaluated on criteria a*, b*. When a value expressed by the equation $\Delta a^*b^* = \{(A1-A2)^2 + (B1-B2)^2\}^{1/2}$, in which in Example 6, $a^* = A1$ and $b^* = B1$, whereas in each three-color black, $a^* = A2$ and $b^* = B2$, the mark ○ was put when it was $\Delta a^*b^* \leq 20$, whereas the mark × was put when it was $\Delta a^*b^* > 20$. The results are shown in Table 4.

TABLE 4

| | Combination | | | | |
|---|---|---|---|---|---|
| | 1 | 2 | 3 | 4 | 5 |
| Result | ○ | ○ | ○ | ○ | X |

From this, it was found that a particular combination is suitable for pigment inks.

As described hereinabove, the ink composition of the present invention permits ink ejection stability even in high speed printing and has an excellent property of quick drying of ink and low-bleeding property on a medium, thereby achieving high quality print.

The invention claimed is:

1. An ink composition comprising:
   (a) an aqueous medium having a conductivity of 250 μS/cm (at 25° C.) or lower;
   (b) a pigment; and
   (c) a compound represented by the formula (I):

wherein m and n each are an integer of 0-11; m+n is an integer of 9-11; x is an integer of 5-9; and y is a number between 2.5-5.

2. The ink composition of claim 1, wherein the mixed compound of the formula (I) is contained in a critical micelle concentration or above.

3. The ink composition of claim 1, wherein its conductivity is 8 mS/cm (at 25° C.) or lower.

4. The ink composition of claim 1, further comprising 10-70 wt % of a water-soluble organic solvent.

5. The ink composition of claim 4, wherein the water-soluble organic solvent comprises at least one organic solvent having a vapor pressure higher than that of water.

6. The ink composition of claim 4, wherein the water-soluble organic solvent comprises at least one organic solvent having a vapor pressure of 0.05 mmHg or lower at 20° C.

7. The ink composition of claim 4, wherein the water-soluble organic solvent is selected from glycol ethers and/or polyhydric alcohols.

8. The ink composition of claim 1, wherein the pigment is a self-dispersion type pigment in which a carboxylic acid or a sulfonic acid is introduced on its surface.

9. The ink composition of claim 1, wherein the pigment is C.I. Pigment Blue 15:3 or C.I. Pigment Blue 15:4.

10. The ink composition of claim 1, wherein the pigment comprises at least one pigment selected from the group consisting of C.I. Pigment Red 122, C.I. Pigment Red 209 and C.I. Pigment Violet 19.

11. The ink composition of claim 1, wherein the pigment comprises at least one pigment selected from the group consisting of C.I. Pigment Yellow 74, C.I. Pigment Yellows 128 and 138, and C.I. Pigment Yellow 180.

12. The ink composition of claim 1, wherein the pigment is a carbon black.

13. An ink set comprising:
   an ink composition of claim 1, wherein the pigment is C.I. Pigment Blue 15:3 or C.I. Pigment Blue 15:4;
   an ink composition of claim 1, wherein the pigment comprises at least one pigment selected from the group consisting of C.I. Pigment Red 122, C.I. Pigment Red 209 and C.I. Pigment Violet 19; and
   an ink composition of claim 1, wherein the pigment comprises at least one pigment selected from the group consisting of C.I. Pigment Yellow 74, C.I. Pigment Yellows 128 and 138, and C.I. Pigment Yellow 180.

14. An ink set comprising:
   an ink composition of claim 1, wherein the pigment is C.I. Pigment Blue 15:3 or C.I. Pigment Blue 15:4;
   an ink composition of claim 1, wherein the pigment comprises at least one pigment selected from the group consisting of C.I. Pigment Red 122, C.I. Pigment Red 209 and C.I. Pigment Violet 19;
   an ink composition of claim 1, wherein the pigment comprises at least one pigment selected from the group consisting of C.I. Pigment Yellow 74, C.I. Pigment Yellows 128 and 138, and C.I. Pigment Yellow 180; and
   an ink composition of claim 1, wherein the pigment is a carbon black.

15. A recording method for recording images comprising allowing an ink composition of claim 1 to adhere to a recording medium.

16. A recording method for recording images comprising applying a pressure to eject drops of an ink and to allow the drops to adhere to a recording medium, using an ink composition of claim 1 as the ink.

17. An ink head comprising:
   (i) an ink tank retaining an ink composition of claim 1;
   (ii) an ink chamber having an ejection orifice through which drops are ejected, and having the ink composition fed from the ink tank; and
   (iii) a piezoelectric element provided inside the ink chamber and causing a strain in response to a voltage applied to the ink composition stored in the ink chamber.

18. An ink head comprising:
   (i) an ink tank retaining an ink composition of claim 1;
   (ii) an ink chamber having an ejection orifice through which drops are ejected, and having the ink composition fed from the ink tank; and
   (iii) a heating element provided inside the ink chamber for heating the ink composition stored in the ink chamber to create a bubble so that a pressure is applied to the ink composition.

19. A recorded image which is recorded by using an ink composition of claim 1.

* * * * *